United States Patent [19]
Bauchot

[11] Patent Number: 5,970,062
[45] Date of Patent: Oct. 19, 1999

[54] METHOD AND APPARATUS FOR PROVIDING WIRELESS ACCESS TO AN ATM NETWORK

[75] Inventor: Frederic Bauchot, Saint Jeannet, France

[73] Assignee: Armonk Business Machines Corporation, Armonk, N.Y.

[21] Appl. No.: 08/802,190

[22] Filed: Feb. 18, 1997

[30] Foreign Application Priority Data

Apr. 23, 1996 [EP] European Pat. Off. .............. 96480047

[51] Int. Cl.[6] ................................. H04J 3/00; H04J 3/06; H04L 12/28
[52] U.S. Cl. ............................ 370/345; 370/395; 370/508
[58] Field of Search ..................................... 370/314, 321, 370/322, 324, 326, 329, 337, 345, 347, 349, 395, 458, 462, 437, 508; 685/34.1, 53.1, 54.2

[56] References Cited

U.S. PATENT DOCUMENTS

| | | |
|---|---|---|
| 5,012,469 | 4/1991 | Sardana ................................... 370/322 |
| 5,384,777 | 1/1995 | Ahmadi et al. ......................... 370/85.2 |
| 5,638,371 | 6/1997 | Raychaudhuri et al. ............... 370/347 |
| 5,644,576 | 7/1997 | Bauchot et al. ........................ 370/437 |
| 5,648,958 | 7/1997 | Counterman ............................ 370/458 |
| 5,751,702 | 5/1998 | Evans et al. ............................ 370/314 |

*Primary Examiner*—Huy D. Vu
*Assistant Examiner*—Chiho Andrew Lee
*Attorney, Agent, or Firm*—John D. Flynn

[57] ABSTRACT

According to the present invention, an adaptive and efficient MAC protocol for wireless access to an ATM network is capable of supporting any type of ATM service class with associated Quality of Services parameters. An ATM cell-switched architecture is utilized in which several ATM Mobile Terminals within a given geographic cell (small cells covering a range of several tens of meters) communicate with an ATM Access Point using radio frequency channels, which is connected to an infrastructure ATM network by the means of conventional ATM links. Mobile Terminals can operate both indoor and outdoor with limited range and have wireless access to the Access Points on the ATM network.

42 Claims, 8 Drawing Sheets

METHOD AND APPARATUS FOR PROVIDING WIRELESS ACCESS TO AN ATM NETWORK

FIELD OF THE INVENTION

The invention relates to data communication and particularly such communication combining the Asynchronous Transfer Mode (ATM) technology and the wireless transmission technology. Specifically, the invention is directed to a Medium Access Control (MAC) protocol, including traffic scheduling policies.

BACKGROUND OF THE INVENTION

Recently the ATM and wireless technologies have gained a high visibility as they provide efficient and economical answers to requirements raised by new telecommunication services and by new end-user behaviors.

ATM has been recognized as the common base on which different types of services an ATM network can provide. The ATM technology can efficiently combine the transmission of speech, video, hi-fi sound (what is commonly called the multimedia traffic) and computer data into the wired network. Furthermore ATM has proven to scale well from very high speed network infrastructure (the information highways) to customer premises networks. One of the great advantages of the ATM technology is the fact that it can guarantee some level of service when an ATM connection is set up. Such guarantees can correspond to transmission rate, transmission latency and information loss. Such guarantees can be achieved mainly because the ATM architecture assumes that the transmission media are almost error free.

Wireless technology is currently becoming more and more successful as it allows mobile end-users to remain connected to their network and applications while being freed from a wired attachment. Different approaches are currently proposed for wireless communications: they differentiate by the services and the coverage they provide. Wireless Wide Area Networks (WAN) like the so-called GSM provide nation-wide coverage to the end-user, with modem equivalent transmission speeds. Wireless Data Packet networks provide nation-wide coverage to the end-user, with the so-called X.25 like transmission services. Finally Wireless Local Area Networks (LAN) provide establishment wide coverage with conventional LAN (e.g. Ethernet) equivalent communication services.

The combination of Wireless transmission with ATM technology is a new trend whose objective is to take advantage of both technologies, and for example to allow a mobile user to access an ATM network infrastructure while taking full advantage of all the facilities available with wired access to the ATM network. Since the main characteristics of each technology are very different, even incompatible, such a combination raises technical problems, as described hereinafter.

ATM technology characteristics

The ATM technology, as currently defined by standardization bodies such as the ATM Forum, and as currently implemented by commercial products, is characterized by the following main aspects:

1) Very short data granularity: in ATM network, all the traffic is carried within so-called ATM cells corresponding to a 53 bytes long structure made of a header field (5 bytes) and a payload field (48 data-bytes).
2) The ATM cells are used either for control and signaling traffic or for information bearer traffic. Full duplex (FDX) links: on each ATM port, it is possible to simultaneously receive and transmit information.
3) Point-to-point links: the media on which ATM cells are transmitted can only connect a pair of ATM stations. Although some ATM concentrator products can give the appearance of multidrop link, the ATM links have a point-to-point topology.
4) Almost error free transmission: the transmission technologies currently used in ATM networks (e.g. over fiber or cable) provide typical bit error rate (BER) below $10^{-9}$. This capability is the main reason for permitting error recovery mechanisms within the ATM end stations and not within the ATM network.

In addition to these aspects, the ATM architecture further introduces the concept of ATM Service Class traffic parameters including Quality of Service (QoS) parameters to allow specifying, at ATM connection set-up, a traffic contract between the ATM end-point and the ATM network. These concepts formalize the characteristics of the user traffic so that each element of the ATM network involved in the end-to-end ATM connection may on one side reserve the necessary resources to provide the required service, and on the other side behave accordingly to the traffic contract. These concepts are summarized in the following table.

TABLE 1

ATM Layer Services Categories

| Attribute | CBR | rt-VBR | nrt-VBR | ABR | UBR | Parameter |
|---|---|---|---|---|---|---|
| CLR | Specified | Specified | Specified | Specified | Unspecified | QoS |
| peak-to-peak CDV | Specified | Specified | Unspecified | Unspecified | Unspecified | QoS |
| Mean CTD | Unspecified | Unspecified | Specified | Unspecified | Unspecified | QoS |
| Max. CTD | Specified | Specified | Unspecified | Unspecified | Unspecified | QoS |
| PCR and CDVT | Specified | Specified | Specified | Specified | Specified | Traffic |
| SCR and BT | N/A | Specified | Specified | N/A | N/A | Traffic |
| MCR | N/A | N/A | N/A | Specified | N/A | Traffic |
| Flow Control | No | No | No | Yes | No | |

CBR: Constant Bit Rate
rt-VBR: real time Variable Bit Rate
nrt-VBR: non real time Variable Bit Rate
ABR: Available Bit Rate
UBR: Unspecified Bit Rate
CLR: Cell Loss Rate
CDV: Cell Delay Variation

TABLE 1-continued

ATM Layer Services Categories

| Attribute | CBR | rt-VBR | nrt-VBR | ABR | UBR | Parameter |
| --- | --- | --- | --- | --- | --- | --- |

CTD: Cell Transfer Delay
PCR: Peak Cell Rate
CDVT: Cell Delay Variation Tolerance
SCR: Sustainable Cell Rate
BT: Burst Tolerance
MCR: Minimum Cell Rate
N/A: Not applicable Finally, the channel should at least provide a capacity of 20 to 25 Mbps, in order to meet the throughput requirements of expected ATM applications. IBM Publication GG24-43300-00 entitled 'Asynchronous Transfer Mode, Technical Overview' presents a broad overview of the ATM concept and details the ATM technology characteristics.

Wireless technology characteristics

The wireless transmissions are characterized by the following main aspects:

1) Poor efficiency to transmit short packets: before transmission of any piece of data over a radio channel, the transmitter must first issue a so-called Physical header which typically correspond to a significant portion of the bandwidth. In order to decrease the associated overhead, the piece of data which is transmitted next must be sufficiently large. For instance with conventional WLAN products, a frame of 1500 bytes (or more) follows the physical header.

2) Half Duplex (HDX) links: the only way to allow FDX operation over a radio channel is first to duplicate the radio modem transceiver (one part dedicated to transmission, the other to reception), and second to split by some means the frequency band into two sub-bands, each of them being used for a one-way transmission. Such an approach is quite expensive and also raises some technical difficulties such as the saturation of the receiving antenna by the emitting one. As a result the only technically and economically viable approach is to rely on a single radio transceiver piece of hardware, and to use the radio channel in HDX mode.

3) Broadcast transmission: the nature of the electromagnetic waves transmission is such that any receiver within range of a transmitter beam can get enough energy to receive information sent by the transmitter. Thus the wireless channel topology must be seen as point-to-multipoint. The use of directional antennas may reduce the reception area and thus the population of potential receivers, but it prevents any mobility of wireless stations. This last limitation is unacceptable for a wireless ATM network aimed to provide mobility support to mobile end-users. As a result, the wireless radio channel must be seen as a multidrop link.

4) High error rate: wireless transmission channels are characterized by poor quality figures. Typically the bit error rates observed on such wireless channels may be as bad as $10^{-3}$ or $10^{-4}$: they are by far higher than what is assumed by ATM networks.

The 'Mobile Communications Handbook' by Jerry D. Gibson, CRC IEEE Press, 1996, ISBN 0-8493-8573-3, gives an extensive description of the wireless technology. From the aforementioned points, it clearly appears that the wireless and ATM technologies significantly differ on important transmission characteristics which are resumed hereafter:

1) The ATM cells are so short that they would induce poor transmission efficiency if they were sent individually over the radio channel, as it is performed over conventional ATM transmission media. Radio transmissions cannot economically provide Full Duplex transmissions which are commonly used on ATM networks.

2) The topology of radio transmissions are not equivalent to the ones found in ATM networks.

3) The bit error rates observed over radio channels are by far worse that the ones assumed by the ATM architecture.

Some known techniques intend to address the technical challenges previously introduced, and may fill the gap between the wireless and the ATM technologies.

A first solution based on high speed point-to-point radio links may meet the requirements of a Wireless ATM network in terms of channel capacity, but cannot provide a satisfying answer to other needs. The main limitation is the point-to-point topology preventing wireless end-user to be mobile. In addition, the scheduling policies commonly used on such radio links have not been built to meet the QoS requirements of ATM connections.

Others solutions based on the conventional WLAN techniques are to some extent in line with some requirements of wireless access to an ATM network, but cannot address all of them. As far as the channel capacity is concerned, some techniques, as the one developed by the ETSI RES 10, committee (the so-called HIPERLAN standard) provide a throughput which may be sufficient for some ATM scenarios. Concerning the channel topology and usage (FDX vs HDX), the U.S. Pat. No. : 5,384,777 to Ahmadi et al provides some techniques for defining a Wireless ATM network, but this solution suffers from important limitations. The most important one is the fact that the used traffic scheduling policy gives a solution to the support of conventional LAN traffic, but cannot guarantee at all the QoS requirements imposed by any type of ATM traffic. In addition to this limitation, the design point of traditional wireless LAN products is optimized for conventional LAN traffic based on large packets: 1.5 Kbytes or more) and therefore presents very poor efficiency figures if packets are replaced by ATM cells.

Therefore, it appears that the conventional wireless LAN technology does not fulfil the requirements of a wireless access to an ATM network.

Accordingly, it would be desirable to be able to provide a method capable of supporting any type of ATM service class with associated QoS parameters in a communication system providing a wireless access to an ATM network.

Furthermore, it would be desirable to be able to provide a system coordinating and optimizing the wireless channel bandwidth which is shared by all Mobile Terminals within a cell in a fair, flexible and ATM compatible manner and to achieve a high throughput.

SUMMARY OF THE INVENTION

A MAC protocol for wireless Radio Frequency (RF) or Infra-Red (IR) access for a plurality of ATM Mobile Terminals to an ATM Access Point is disclosed. The MAC protocol is based on a reservation scheme for the portion of the user traffic which is guaranteed by the ATM contract during the ATM connection set-up, and a random access technique for the portion of the user traffic above the guaranteed level, and for the MAC control traffic. There is a time division structure in which time is slotted, and time slots are grouped into variable length time frames consisting of downlink time slots and uplink time slots. The variable length time frame consists of three periods (DOWN, UP_RESERVED, UP_CONTENTION). The first period, the DOWN period, is the downlink channel which is used exclusively for data transfer from the Access Point to the Mobile Terminals. The following period, the UP_RESERVED period, is the uplink channel that is used for contention-free data transfer from the Mobile Terminals to the Access Point. The allocation of the time slots in the DOWN and UP_RESERVED periods is performed by the Access Point, and depends on one side on the service class and QoS parameters of each established ATM connection between the Mobile Terminals and any ATM station according to different priority levels derived from the ATM contract parameters, and on the other side the allocation of the time slots depends on the instantaneous traffic characteristics of these ATM connections. The portion of the uplink bandwidth which is reserved by the Access Point to a given Mobile Terminal is used by this Mobile Terminal to send traffic according to ATM class and QoS parameters. The last period of the frame, the UP_CONTENTION period, is the uplink channel used by the Mobile Terminals to transmit reservation requests, or data packets or control packets in a random-access contention mode using the slotted Aloha technique. For instance the close to expiry ATM cells will be sent within the UP_CONTENTION period if they cannot wait for a next frame slot reservation. The duration of theses three periods, as well as the duration of the complete time frame made by these three periods may be varied using a movable boundary technique within the limits of upper bounds whose values also depend on the ATM class and QoS parameters of active connections. The traffic is scheduled by the Access Point which specifies at the beginning of each time frame in a dedicated control packet called the Frame Header, how each time slot of the time frame is allocated.

More generally, the invention relates to a method and an apparatus for a medium access control (MAC) scheme in a data communication system of the type comprising at least one first network based on a first technology, and including at least one station, at least one second network based on a second technology, and including at least one station, and wherein the first and second network technologies being of a different type, the system also comprising access means for providing communication between the stations of the first and the second networks, the method of the invention including the steps of defining a plurality of successive time frames during which traffic of data from the first or the second technology is carried out, and scheduling the exchange of data information during each successive time frame according to network parameters of each first and second networks, and according to traffic characteristics and constraints.

DESCRIPTION OF THE PREFERRED EMBODIMENT

A MAC protocol is described that is based on an hybrid scheme relying both on reservation and contention techniques. The traffic supported by this protocol encompasses on one side any ATM traffic (including ATM bearer information and ATM signaling information), and on the other side some control traffic needed for the operation of the MAC protocol. The proposed scheme is based on a time division frame structure whose length is variable. Time is slotted, and time slots are grouped into time frames. The time frame is also divided into three periods: the DOWN period, is the downlink channel which is used exclusively for data transfer from the Access Point to the Mobile Terminals, the following period, the UP_RESERVED period, is the uplink channel that is used for contention-free data transfer from the Mobile Terminals to the Access Point, and the last period of the frame, the UP_CONTENTION period, is the uplink channel used by the Mobile Terminals to transmit reservation requests, or data packets or control packets in a random-access contention mode using the so-called slotted Aloha technique. From Table 1, it appears that very different traffic classes are today part of the ATM architecture and that they require different kinds of support. It means that the Access Point, when scheduling traffic between all the alive ATM connections, must be aware of the traffic and QoS parameters in order to guarantee the traffic contract. This guarantee can only be delivered if some deterministic method (as opposed to contention-based method) is used for allocating bandwidth to each individual ATM connection. This is the justification of using a reservation technique. In the later, the entity of the Access Point which is in charge of scheduling the traffic will be referred to as the Scheduler. More accurately, this entity is called the Master Scheduler, as opposed to the Slave Scheduler which is the Mobile Terminal entity in charge of assigning ATM cells to the uplink time slots reserved by the Access Point to the Mobile Terminal, and of generating the bandwidth reservation requests.

Then, the invention may include the following features:
1) A reservation method which is based both on ATM connection service parameters and on instantaneous traffic load information.
2) A unified scheduling policy for support of any type of ATM traffic and of control traffic.
3) A queuing and memory management method minimizing the data movements needed before real transmission of ATM cells.

4) A technique for flexibly and dynamically adjusting the time frame boundaries and lengths to achieve maximum throughput and to guarantee ATM service class and QoS parameters.

Figure 1:
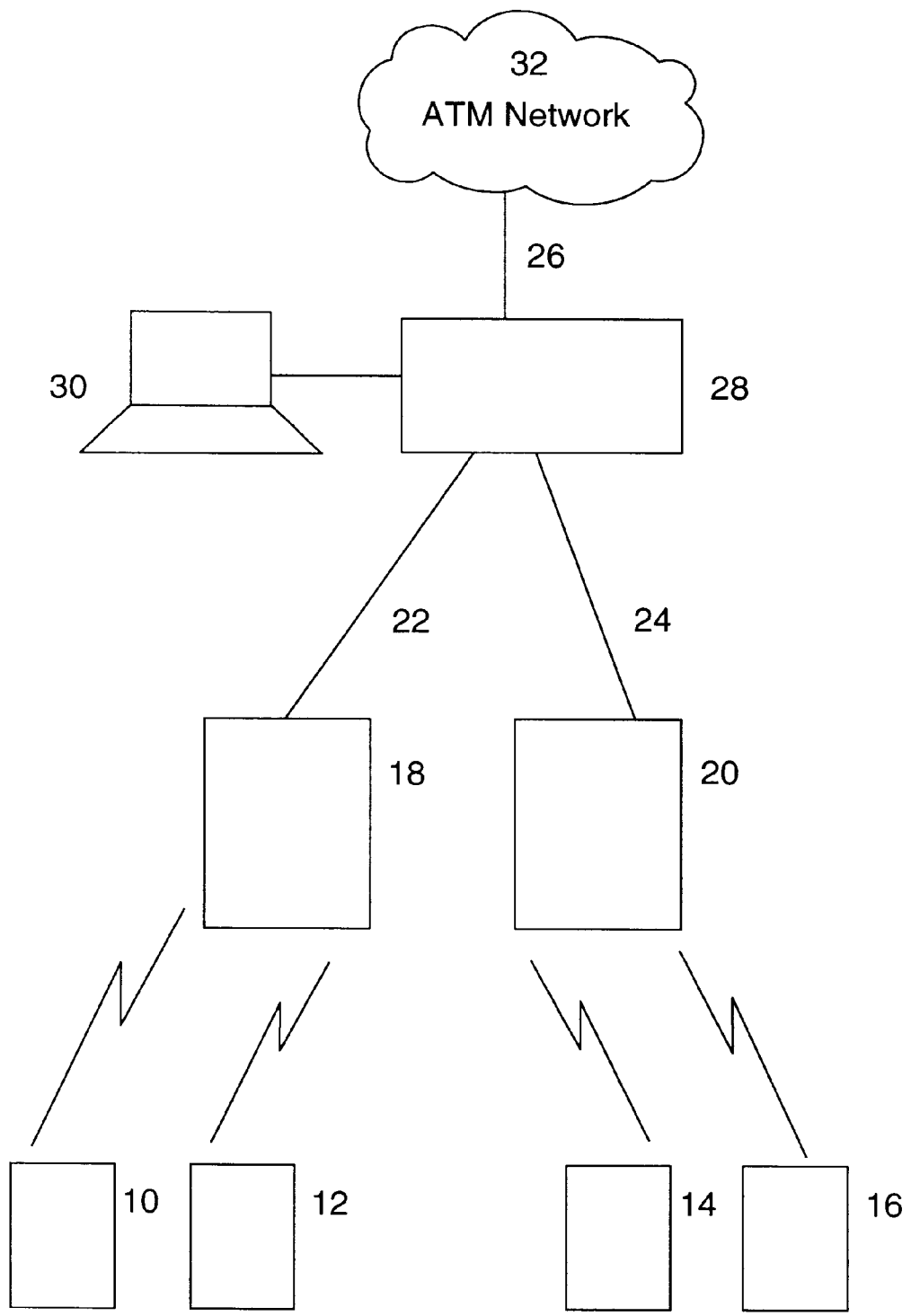
FIG. 1 is a pictorial diagram showing a communication system providing wireless access to an ATM network of the type in which the invention is implemented.

Referring now to the drawings, and more particularly to FIG. 1, there is shown a wireless network allowing communication between a plurality of Mobile Terminals (10, 12, 14, 16) and applications hosted by ATM stations (not shown) belonging to the ATM network 32. The computing system includes an ATM Switch 28 or equivalent equipment, with attached monitor station 30, which is connected to the ATM network through a conventional ATM link 26, and to one or more Access Points (18, 20) through conventional ATM links (22, 24). These Access Points are featured according to the invention with radio system management functions which co-ordinate the Mobile Terminals access to the shared radio channel.

Figure 1A:
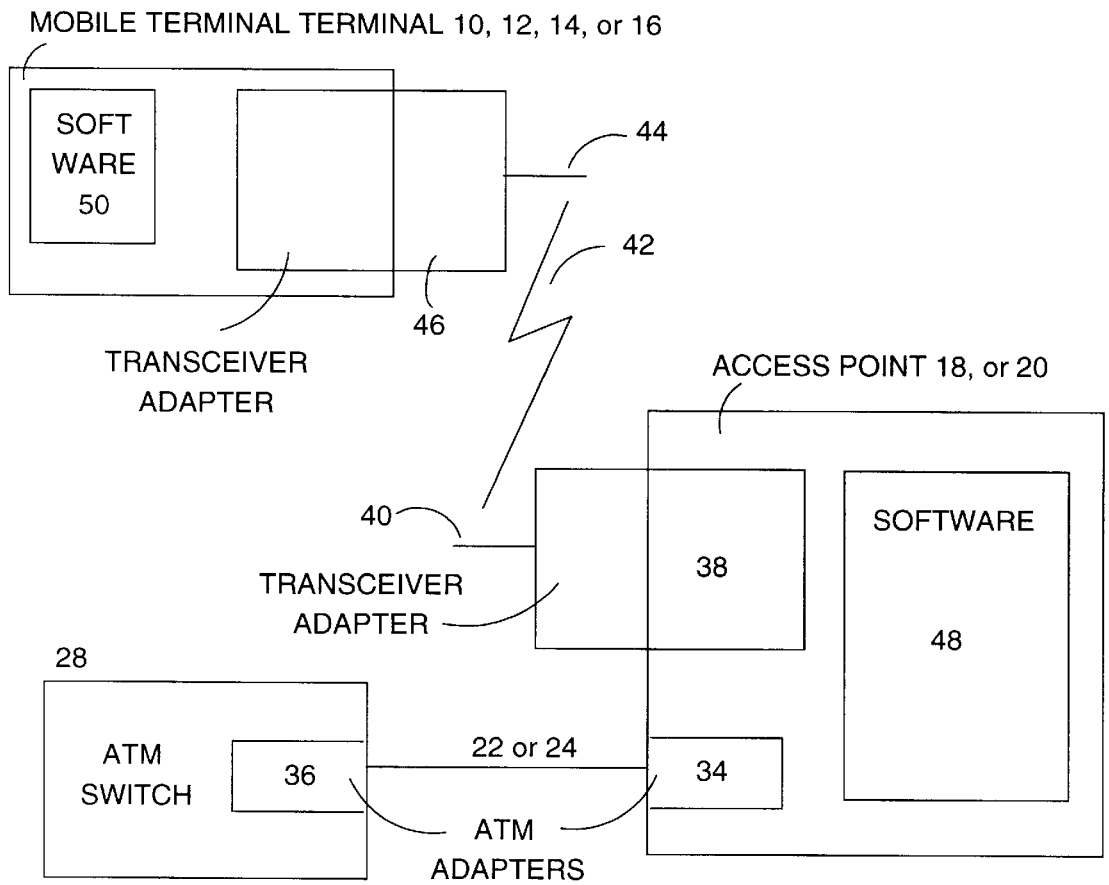
FIG. 1A is a block diagram of the system shown in FIG. 1 illustrating the basic components of a Mobile Terminal and an Access Point.

As shown in more detail in FIG. 1A, an Access Point 18 or 20, which may be a conventional ATM concentrator or a microcomputer, has an ATM adapter 34 inserted in a bus slot and connected to the ATM link 22 or 24. The ATM switch 28 also has an ATM adapter 36 inserted in a bus slot and connected to the ATM link 22 or 24. The ATM link 22 or 24 is of conventional design. The Access Point 18 or 20 also has a RF transceiver adapter 38 implemented as a printed circuit card which is inserted in a bus slot of the Access Point. The transceiver adapter 38 has an antenna 40 by which a radio link 42 is established with one or more Mobile Terminals (10, 12, 14, 16). The Mobile Terminal may itself be any type of conventional design computer and, like the Access Point, it is provided with a transceiver adapter 46, also implemented as a printed circuit card which is inserted in a bus slot of the computer, and an antenna 44. The Access Points and the Mobile Terminals are further provided with software (48, 50) which supports their respective transceiver adapters.

Figure 2:
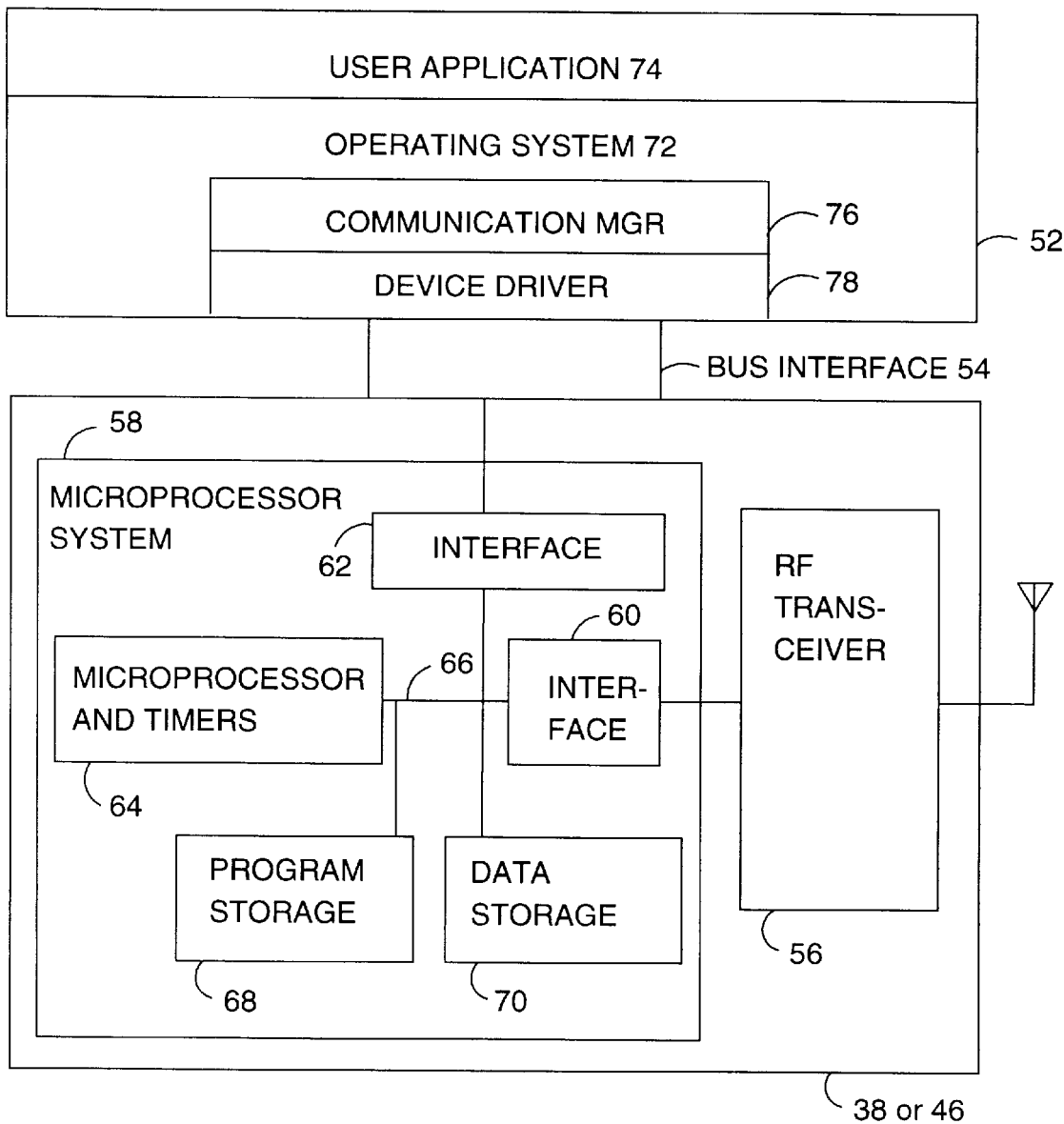
FIG. 2 is a block diagram of the radio system used in the implementation of a preferred embodiment of the invention.

Now referring to FIG. 2, the radio system common to both the Mobile Terminals and the Access Points of FIG. 1, is shown. The radio system includes a transceiver adapter 38 or 46 connected to the computer 52 via the computer bus interface 54. The transceiver section is itself divided into an RF transceiver 56, which may be a commercially available 'GMSK' or 'OFDM' based transceiver, and a dedicated microprocessor system 58 which controls the transceiver via an interface 60. The microprocessor system 58 further includes a system interface 62 which interfaces the transceiver section to the computer section 52. The microprocessor system includes a dedicated microprocessor 64 running real-time oriented operating system and including some high-resolution hardware timers. Microprocessor 64 is connected by a memory bus 66 to program storage 68 and data storage 70 as well as to interfaces 60 and 62 providing attachment to bus interface 54 and RF transceiver 56, respectively. Program storage 68 is typically read only memory (ROM), while data storage 70 is static or dynamic random access memory (SRAM or DRAM). Packets received or to be sent are held in data storage 70 and communicated to or from the RF transceiver 56 via interface 60 under control of serial or parallel channels and a direct memory access (DMA) controller which is part of the microprocessor 64.

The computer 52 runs an operating system 72 which supports one or more user application programs 74. The operating system 72 may include an ATM compatible communications manager 76, or the ATM compatible communications manager 76 may itself be an application program installed on the computer. In either case, the ATM compatible communication manager 76 controls a device driver 78 via the operating system 72. The device driver 78, in turn, communicates with the transceiver adapter 38 or 46 via bus interface 54.

The protocol system is now described, and particularly the time frame structure is detailed with reference to FIG. 3.

Time Frame Structure

Figure 3:
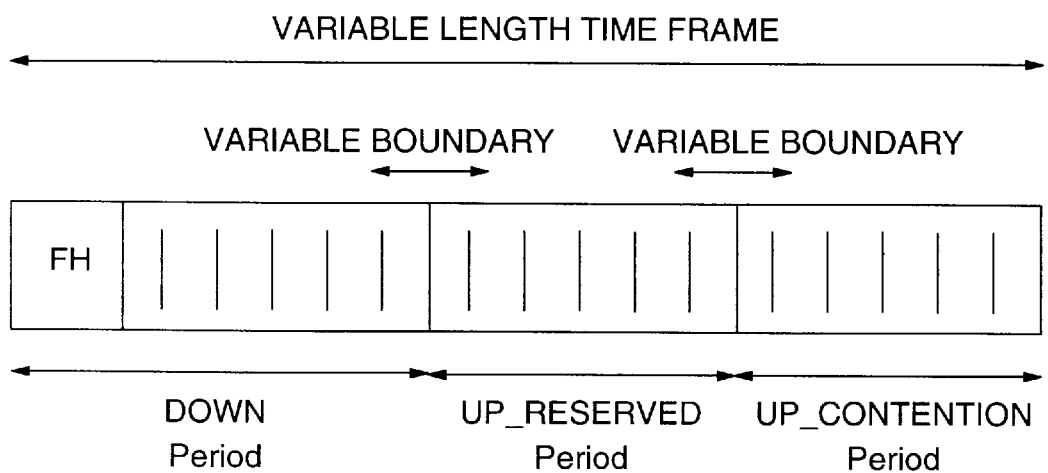
FIG. 3 is a diagram of the structure of the MAC protocol time frame according to the invention.

The variable length frame structure consists of three periods (DOWN, UP_RESERVED and UP_CONTENTION), as shown in FIG. 3, and of a Frame Header (FH) control packet belonging to the DOWN period. The DOWN period is the downlink channel which is used exclusively for data transfer from the Access Point to the Mobile Terminals. The UP_RESERVED period is the uplink channel that is used for contention-free data transfer from the Mobile Terminals to the Access Point. The UP_CONTENTION period is the uplink channel used by the Mobile Terminals to transmit reservation requests, or data packets or control packets in a random-access contention mode using the slotted Aloha technique.

The protocol is driven by the Master Scheduler entity running in the Access Point which is in charge of scheduling all the traffic originating in the different sources of the wireless cell. The output of the Master Scheduler is a slot map which is carried in the FH packet broadcast at the beginning of each time frame. This slot map specifies information concerning the current time frame. First, it indicates the length of the time frame, second, it locates the boundaries between the DOWN and UP_RESERVED periods, and between the UP_RESERVED and UP_CONTENTION periods, and finally how the bandwidth available in the time frame is allocated to the different sources active in the wireless cell. By receiving the slot map carried in each FH packet, each individual Mobile Terminal can determine on the fly the characteristics of the current time frame and also when it is authorized to either send or receive a given packet over the wireless channel.

Each of the three periods introduced above is further split into a finite (and upper bounded) number of time slots, which are the time granularity used to specify bandwidth allocation. As it will be discussed later, a specific aspect of the invention is the fact that contiguous transmission can be spread over consecutive time slots, increasing therefore the overall efficiency of the protocol. This aspect is quite different from other conventional Time Division Multiple Access (TDMA) schemes (such as the ones used in conventional wireless LAN), where every time slot contains the transmission of a single piece of information, including therefore the overhead introduced by the RF transceiver for synchronization or equalizer convergence purpose.

Traffic Priorities

When the Master Scheduler allocates time slots to the various ATM connections alive in the wireless cell, it must take into account the respective characteristics of each of them in order to guarantee the service class and QoS parameters which have been set-up when the ATM connections were established.

In order to minimize the computing overhead of the Master Scheduler, it is possible for any type of ATM service class to identify some consistent behavior of the Master Scheduler. The invention proposes to define for each ATM service class two different thresholds: the Reserved Bandwidth (RBW) threshold and the Peak Bandwidth (PBW) threshold. These thresholds can be easily mapped to ATM service class parameters, as outlined in the following table.

TABLE 2

| ATM Services Class | CBR | rt-VBR | nrt-VBR | ABR | UBR |
|---|---|---|---|---|---|
| RBW | PCR | SCR | SCR | MCR | N/A |
| PBW | PCR | PCR | PCR | PCR | PCR |

RBW and PBW thresholds

Some conventional techniques, like leaky bucket algorithms, can be used either in the Access Point or in the Mobile Terminal, to determine for each ATM cell to be transmitted over the wireless channel, if it corresponds to traffic either above or below the two former thresholds.

The scheduling policy is based on these two thresholds. The portion of the traffic which remains below the RBW threshold is carried out in time slots which are statically reserved when the ATM connection is set-up. It means first that the Master Scheduler must be aware of the traffic characteristics when any ATM connection is set-up, and second that the Master Scheduler allocates on a regular basis the necessary number of time slots required to reach the RBW traffic threshold. Different techniques can be applied to ensure that the Master Scheduler is aware of the ATM connection traffic characteristics. They can rely for instance on some dedicated control protocols between the Access Point and the ATM Switch (28 in FIG. 1), or on some spying of the ATM signaling flow passing through the Access Point when the ATM connection is set up.

The portion of the traffic which remains between the RBW and the PBW thresholds is carried in time slots which are either dynamically reserved or (for the uplink traffic) sent in the UP_CONTENTION period, at the time this traffic arises. This leads to some means for allowing the Mobile Terminals to inform the Access Point when such uplink traffic occurs between the RBW and the PBW thresholds. Such means correspond to a bandwidth request channel that carries time slot reservation requests from the Mobile Terminals to the Access Point. Such requests can be carried either as piggybacked information in packet flowing during the UP_RESERVED period, if any, or to some dedicated control packet sent in the UP_CONTENTION period. In both cases the request should specify the required number of time slots to be allocated as well as some identifier of the corresponding ATM connection. Alternatively, it is also possible for the Mobile Terminal to issue in the UP_CONTENTION period a data packet with piggybacked information corresponding to the remaining packets not yet transmitted.

Finally, the portion of the traffic which sits above the PBW threshold can be handled in a similar way to the one located between the two thresholds, but the Master Scheduler must be able to distinguish them. Indeed as outlined later, the priority assigned by the Master Scheduler to these two types of traffic (either above or below the PBW threshold) will differ and the corresponding ATM cells may be tagged with Cell Loss Priority (CLP) bit set to the value 1.

Therefore, it is possible, thanks to the bandwidth request channel, to let the Access Point be aware of any uplink traffic above the PBW threshold. As far as the downlink traffic is concerned, the Access Point can determine alone which portion of the traffic sits above or below the RBW or PBW thresholds. The combination of these two information gives to the Master Scheduler a comprehensive view of all the outstanding traffic, which can be split on one side between the uplink traffic and the downlink traffic, and on the other side according to their position with respect to the RBW and PBW thresholds.

The Master Scheduler operates by defining some priorities to the different types of traffic identified above. The first criteria used to assign priorities is derived from the service guarantee that the ATM connection has received at connection set-up. Thus, traffic sitting before the RBW threshold must be served first, then the traffic located between the RBW and PBW thresholds must be served second and finally the remaining traffic sitting above the PBW threshold must be served last. As Call Admission Control is used in ATM networks, there should be no difficulty to serve all the traffic sitting below the RBW threshold. It means that the channel capacity should always absorb all the possible ATM traffic as long as it does not exceeds its RBW threshold. The second criteria used to assign priorities is related to the ATM service class, because some service classes are more time sensitive than others. The conventional priority gives the highest priority to the more time sensitive traffic, so that it corresponds to the following order (by declining priorities): CBR, rt-VBR, nrt-VBR, ABR and UBR. Finally it should also decide how the uplink traffic is served vs the downlink traffic. The expected networking environment for wireless access to ATM network is such that the Mobile Terminals will most of the time host some client applications interoperating with server applications running in the ATM infrastructure network. The resulting traffic will be unbalanced between the uplink and the downlink path, with most of the traffic being carried along the downlink path. Table 3 specifies, for all the different traffic types, the associated priorities assigned by the Master Scheduler (the higher priority corresponding to the lower index 1).

TABLE 3

Priority by Traffic Type

| Traffic Type | | Below RBW | RBW to PBW | Above PBW |
|---|---|---|---|---|
| CBR | down | 1 | N/A | 17 |
| CBR | up | 2 | N/A | 18 |
| rt-VBR | down | 3 | 9 | 19 |
| rt-VBR | up | 4 | 10 | 20 |
| nrt-VBR | down | 5 | 11 | 21 |
| nrt-VBR | up | 6 | 12 | 22 |
| ABR | down | 7 | 13 | 23 |
| ABR | up | 8 | 14 | 24 |
| UBR | down | N/A | 15 | 25 |
| UBR | up | N/A | 16 | 26 |

Cell Train Concept

Having set the priorities for each traffic type, it is necessary to arrange the transmission of the corresponding ATM cells in a way maximizing the overall protocol efficiency. As wireless transmissions suffer on one side from an important overhead introduced by the RF transceiver, and on the other side from a low quality bit error rate, some innovative means must be introduced. In conventional wireless LAN techniques, the frames to be carried over the wireless channel are typically large so that they may require some segmentation before being transmitted. The segment size is chosen as a good balance between a too large size inducing bad Block Error Rate figures and a too small size inducing bad protocol efficiency figures. With ATM traffic, the problem is quite different as the information granularity (the ATM cell) is very short, compared to regular MAC frames found in LAN networking environments. Thus it is necessary to introduce some grouping of the ATM cells, resulting in a so-called cell train. Such cell trains correspond to a contiguous data stream made of the concatenation of successive ATM cells. As such cell train may contain a variable number of ATM cells, it would not be efficient to map the slot size on the maximal cell train size. The slot size is determined as being equal to the time duration required to transmit a single ATM cell so that any cell train will only consume the minimal number of time slots required for its transmission. Such cell trains correspond to the piece of information carried over the wireless channel between peer wireless MAC entities and can thus be matched to the so-called MAC Protocol Data Unit (MPDU), as commonly used in the OSI model. A cell train can be constituted by a single ATM cell, or by several of them, but constraints imposed by the characteristics of the RF transceiver (for instance for clock recovery purpose) ask to upper bound their number. We will denote by Ntrain the maximal number of ATM cells per cell train or MPDU. These cell trains will be transmitted in the different periods of the time frame, according to the scheduling policy specified by the Master Scheduler.

Time Frame Length

The length of the time frame must be set as the optimum trade-off between a too short duration (inducing excessive overhead due to the FH packet) and a too long duration (inducing excessive latency, mainly for the real-time traffic). These two constraints may evolve over time as a result of varying characteristics of the traffic, both in terms of traffic volume and in terms of traffic nature. As a result a variable length time frame can ensure optimization of the protocol efficiency in terms of both throughput and quality of service.

If the volume of traffic is quite low (meaning that the channel capacity is much larger than the amount of traffic), there is no penalty of using short time frames inducing a lot of transmitted FH packets. If the traffic is not time critical, there is no penalty of using long time frames inducing a relatively large latency to go through the MAC layer. In the general case, the Master Scheduler must determine the maximal time frame length on the base of the service class and QoS parameters of the various ATM connections currently carried over the wireless channel. This upper bound, expressed in time slots, is represented by the variable NTF_MAX. It is computed by a dedicated algorithm (run by the Master Scheduler) which uses the service class and QoS parameters of the ATM connection quantifying to which limits successive ATM cells can be grouped together (and thus be delayed). In the preferred embodiment of the invention, the parameters PCR, CDVT, CTD and BT (as defined in Table 1) are used to derive NTF_MAX. The time interval TCELL (evaluated in time slot duration units) between two successive ATM cells, is directly derived from the PCR parameter, and the number CGROUP of ATM cells that can be grouped together, is directly derived from the parameters CDVT, CTD and BT. From these two parameters TCELL and CGROUP, the maximum time frame duration NTF_MAX is computed with respect to the following equation:

Equation 1: Time frame maximum size evaluation $$NTF\_MAX = \text{Min. of all Connections } (a \times TCELL \times CGROUP + b, c),$$

where the coefficients a, b and c permit some implementation constraints to be taken into account, such as available memory size or microprocessor computing power.

Another constraint that can be taken into account is the fact that the UP_CONTENTION period cannot be empty as the traffic occurring during it cannot be anticipated by the Master Scheduler. It is not the case for the two other periods (with reserved traffic) as the Master Scheduler knows exactly which amount of traffic is reserved (this traffic being possibly null). Thus in each time frame, the Master Scheduler must allocate a minimum number of time slots for the UP_CONTENTION period. In addition, the length of this period must also evolve over time as the number of Mobile Terminals change (to avoid situations where a too large population of Mobile Terminals contend on a too small number of contention time slots). The Master Scheduler estimates this as the sum of two parameters: NUP_CONTENTION=N1+N2. The first parameter N1 is constant and corresponds to the minimal number of contention-based time slots needed to allow any new Mobile Terminal to signal its presence to the Access Point. Indeed when a brand new Mobile Terminal wishes to enter a wireless ATM network, it is unknown to the Access Point so that it can only rely on contention-based time slots to issue the very first control packet notifying the Access Point of its presence. The second parameter N2 corresponds to the time slots needed by the Mobile Terminals known by the Access Point to place reservation requests. As such reservation requests can be carried either as information piggybacked within uplink MPDU (during the UP_RESERVED period), or as a dedicated control packet issued during the UP_CONTENTION period, the Master Scheduler computes N2 from the number of known Mobile Terminals for which uplink traffic is not scheduled during the current time frame. If this number is represented by MTUP_IDLE, then N2 is estimated as a function of MTUP_IDLE, such that N2 =f(MTUP_IDLE ), where the function f(x) can be a linear or an exponential function of x. The exact definition of f(x) is dependent on some implementation constraints, such as the computational capabilities and the computing power available in the implemented microprocessor. Nevertheless, f(x) must increase when x increases.

Finally, if the number of time slots found in the time frame, in the DOWN period and in the UP_RESERVED period are respectively represented by the variables NTF, NDOWN, and NUP_RESERVED, then the Master Scheduler must perform its slot allocation process under the following constraint:

Equation 2: Time frame upper limit $$NTF = NDOWN + NUP\_RESERVED + NUP\_CONTENTION,$$

wherein NTF=<NTF_MAX.

The operation at the Access Point is now described with reference to FIG. 4. The process run by the Access Point can be split into three different tasks: the first task run by an ATM cell Handler, referenced as 80, which interacts with the interface 62, either sends or receives ATM cells from the upper layer component; the second task is run by an MPDU Handler, referenced as 82, which interacts with the interface 60 to either send or receive MPDU from the RF transceiver; and the third task is run by the Master Scheduler, referenced as 84.

The ATM cell Handler 80 and the MPDU Handler 82 interface themselves by the means of two different queues: the transmission queue, or XMIT_Q referenced as 86, and the reception queue, or RCV_Q referenced as 88. Further a reservation request queue RES_Q referenced as 90 is used between the MPDU Handler and the Master Scheduler to log any received reservation request previously issued by a Mobile Terminal.

ATM Cell Handler at the Access Point

Figure 4:
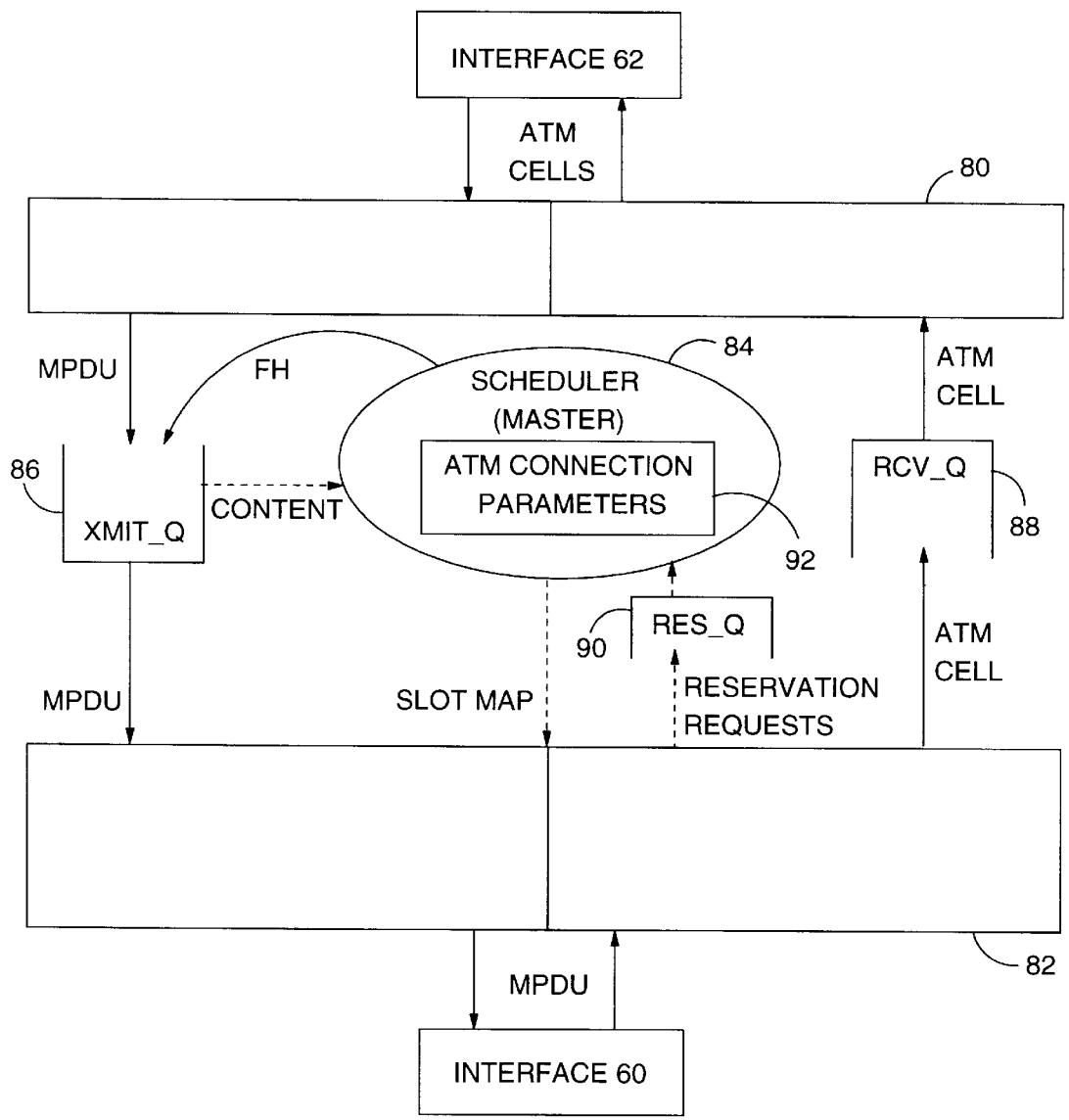
FIG. 4 is a block diagram of the Access Point MAC entities used in the implementation of a preferred embodiment of the invention.

The ATM cell Handler 80 is further split into two sub-entities: one dealing with reception of ATM cells from the interface 62 (left side of block 80 on FIG. 4), the other sub-entity dealing with transmission of ATM cells to the interface 62 (right side of block 80 on FIG.4).

The reception side is responsible for building the so-called cell trains on the base of the successive ATM cells received from interface 62. Then in a preferred embodiment of the invention, a dedicated memory management scheme is used where the available memory (within data storage 70) is organized as a pool of buffers, each buffer being sized to contain a train made of Ntrain×ATM cells. At any point in time, several such buffers are available, each of them corresponding to a given traffic type, as identified in Table 3 (down link traffic corresponding to the odd index). The selection of the right buffer to use is based on the suggested leaky-bucket algorithm which can specify for any incoming ATM cell the associated priority, based on the corresponding service class and the position with respect to the thresholds RBW and PBW. If the buffer is found full (meaning that the received ATM cell is the last one of the cell train), then a new buffer must be dynamically allocated to host other ATM cells to come later. As each buffer is associated to a unique traffic type, it means that the XMIT_Q queue is implicitly instanced by traffic types. It can thus be seen as a set of different sub-queues MPDU_Qj, each of them being characterized by its own priority index j (odd index), as specified in Table 3.

The transmission side of the ATM cell Handler, is responsible for transmitting to the interface 62 the different ATM cells which have been previously received within MPDU from the interface 60. When an ATM cell has been passed to the interface 62, the corresponding memory can be returned to a pull of free memory.

MPDU Handler at the Access Point

The MPDU Handler 82 is further split into two sub-entities: one dealing with reception of MPDU from the interface 60 (right side of block 82 on FIG.4), the other sub-entity dealing with transmission of MPDU to the interface 60 (left side of block 82 on FIG.4).

The transmission side is responsible for sending to the interface 60 the MPDU specified in the slot map built by the Master Scheduler 84 during the DOWN period. Once a MPDU transmission is complete, the associated buffer can be released and returned to a pool of free buffers.

The reception side is responsible for receiving from the interface 60 the MPDU specified in the slot map built by the Master Scheduler 84 during the UP_RESERVED period, and also those received during the UP_CONTENTION period. For each received MPDU, the reception side has several tasks to perform. First it must extract the ATM cells from the MPDU and enqueue them in the RCV_Q queue. Second it must identify any reservation request carried in the received MPDU and pass it to the Master Scheduler through the RES_Q queue referenced as 90.

Master Scheduler

The Master Scheduler 84 operates each time a time frame ends. At this instant, its task is to schedule the traffic for the next time frame to come, based on two information: the amount and nature of the waiting downlink and uplink traffic, as represented by the content of both the XMIT_Q queue 86 (more precisely the sub-queues MPDU_Qj) and the reservation request queue RES_Q 90, and the second information is the characteristics of the various ATM connections flowing over the wireless channel, referenced as 92. The same way the XMIT_Q has been split into sub-queues MPDU_Qj (the index j being odd), it is also possible for the uplink traffic to define sub-queues MPDU_Qj (the index j being even). This task is performed by the Master Scheduler from the information 92 and from the RES_Q 90. The ATM connection parameters specify the part of the traffic which will be statically reserved by the Master Scheduler (indexes 2, 4, 6 and 8 in Table 3): they allow to build the sub-queues MPDU_Qj, where j takes the values 2, 4, 6 and 8. Note that any uplink MPDU or cell train cannot be shared between different Mobile Terminals. Nevertheless they can contain ATM cells belonging to different ATM connections as long as these connections originate in the same Mobile Terminal. The reservation requests logged in RES_Q, combined with the RBW and PBW thresholds, as derived from parameters 92, dictate the content of the remaining uplink sub-queues MPDU_Qj, where j takes the even values between 10 and 26 included. Here again the same constraint concerning the sharing of a given uplink MPDU between different Mobile Terminals applies. When the Master Scheduler has performed this task, it can then go through all the MPDU_Qj where the index j varies within its full range, and allocate accordingly the traffic under the constraint of Equation 2.

Before further describing the Master Scheduler process, let the following notations be introduced:

1) The MPDU_Qi contains a number of MPDU equal to Mi. Each of them is noted MPDUi,j and contains ci,j ATM cells (the index j varies between 1 and Mi). The aggregate number of ATM cells in MPDU_Qi is equal to ci.

2) The FH control packet issued at the beginning of each time frame is carried in a dedicated MPDU called FH_MPDU, which is enqueued in a specific queue MPDU_Q0 of highest priority. This MPDU contains nFH ATM cells.

3) Each time any MPDU is sent over the air, the corresponding overhead of the RF transceiver consumes nRF equivalent ATM cells.

Figure 5:
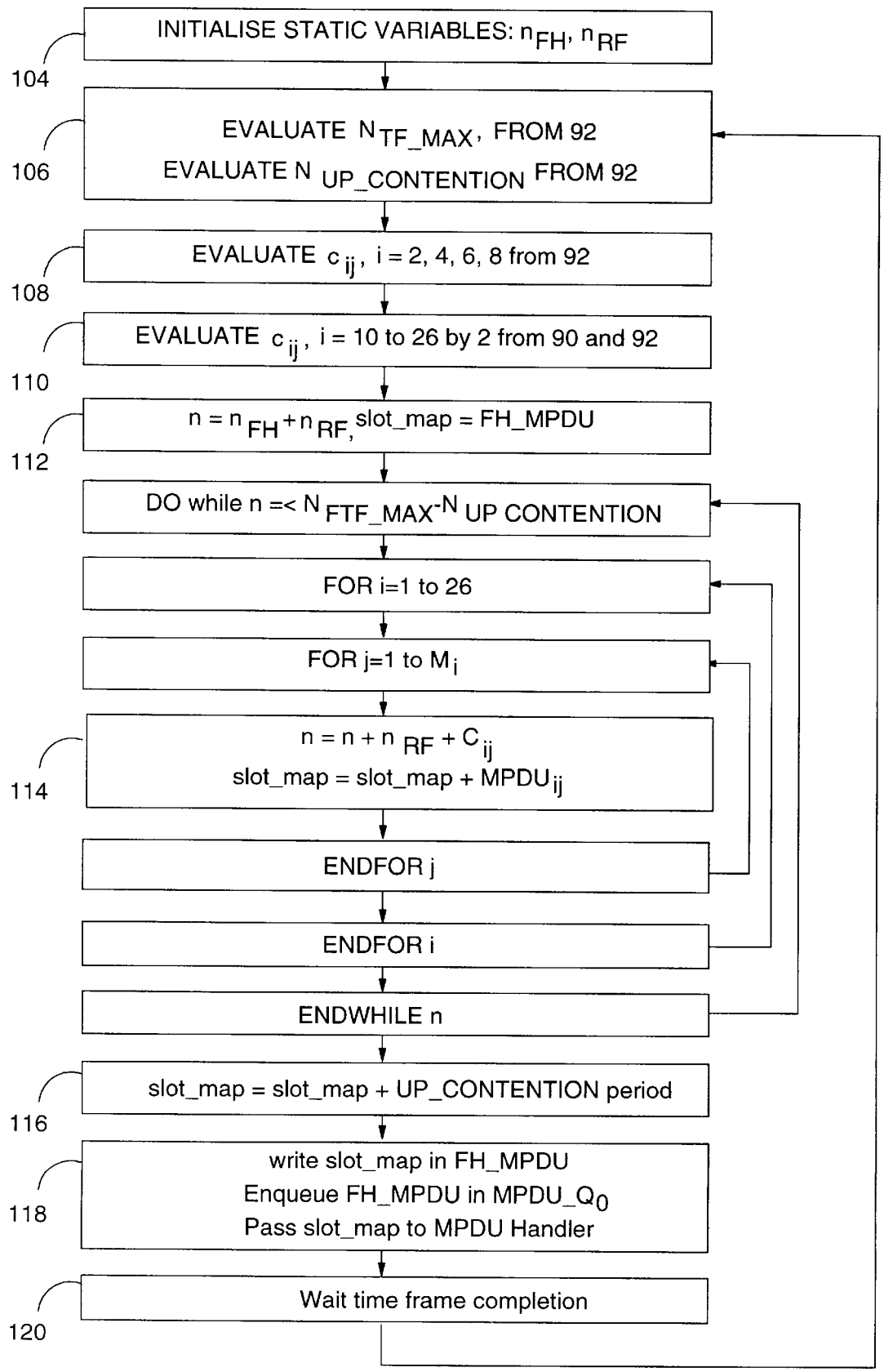
FIG. 5 is a flow chart of the logic followed by the Access Point Master Scheduler according to the MAC protocol of the invention.

The Master Scheduler processing is represented by FIG. 5. At the very beginning, the Master Scheduler initializes the static variables nFH and nRF (block 104). Then it enters an endless loop which occurs each time a time frame completes (block 120). The first task in this loop is to evaluate, based on the algorithms previously described, the upper bound of the current time frame NTF_MAX from the information 92 specifying the parameters of the current ATM connections flowing over the wireless channel, as well as the duration of the third UP_CONTENTION period represented by the variable NUP_CONTENTION (block 106). Then the Master Scheduler evaluates the variables ci,j from the content of the uplink MPDU_Qi queues, first with index i less than or equal to 8 (block 108), then with index i taking the remaining values (block 110). Then the Master Scheduler initializes the current time frame (block 112) by filling it with the FH_MPDU (which is always present, even if no traffic is scheduled at all), and by initializing the time frame length n with the number of time slots required to transmit FH_MPDU. At this point, the Master Scheduler enters another loop, for each of the queue MPDU_Qi, and for each MPDUi,j within this queue to update the slot map of the current time frame. This construction is done in block 114 as long as the aggregate total number of time slots belonging to the two first periods DOWN and UP_RESERVED remains below the upper limit NTF_MAX—NUP_CONTENTION. If this upper limit is reached or if all the reserved traffic can be scheduled, the Master Scheduler completes the slot map by adding the last period UP_CONTENTION to the current time frame (block 116). Finally the slot map is recorded in the FH_MPDU which is enqueued in MPDU_Q0, and the main loop completes when the Master Scheduler provides the MPDU Handler with the slot map to be used to initiate either MPDU transmissions or receptions during the current time frame (block 118).

Figure 6:
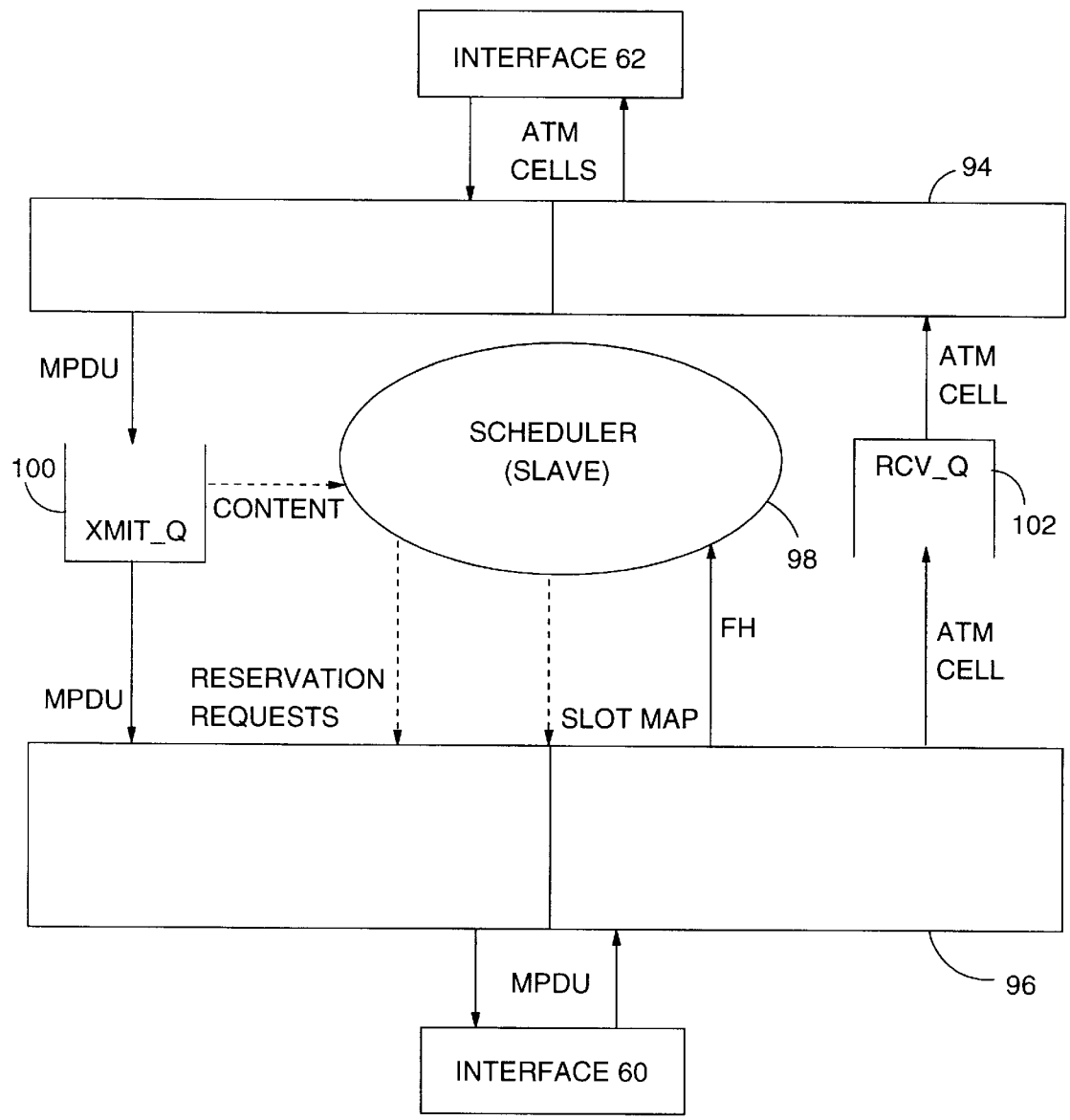
FIG. 6 is a block diagram of the Mobile Terminal MAC entities used in the implementation of a preferred embodiment of the invention.

The operation at the Mobile Terminal is now described with reference to FIG. 6. The process run by the Mobile Terminal can be split into three different tasks: the first task is run by an ATM cell Handler, referenced as 94, which interacts with the interface 62 to either send or receive ATM cells from the upper layer component; the second task is run by an MPDU Handler, referenced as 96, which interacts with the interface 60 to either send or receive MPDU from the RF transceiver; and the third task is run by the Slave Scheduler, referenced as 98. The ATM cell Handler and the MPDU Handler interface themselves by the means of two different queues: the transmission queue, or XMIT_Q referenced as 100, and the reception queue, or RCV_Q referenced as 102.

ATM Cell Handler at the Mobile Terminal

The ATM cell Handler is further split into two sub-entities: one dealing with reception of ATM cells from the interface 62, the other dealing with transmission of ATM cells to the interface 62. The reception side is responsible for building the so-called cell trains on the base of the successive ATM cells received from interface 62. A similar memory management scheme as the one used in the Access Point may be used in the Mobile Terminal, but others schemes may be adapted without departing from the scope of the invention. The available memory (within data storage 70) is organized as a pool of buffers, each buffer being dimensioned to contain a train made of Ntrain ATM cells. At any point in time, several such buffers are available, each of them corresponding to a given traffic type, as identified in Table 3 (with even index). The selection of the right buffer to use may on a preferred embodiment of the invention rely on the same approach as the one used in the Access Point (for instance using a leaky buffer based method). On another embodiment, the selection of the right buffer can also take advantage of the information contained in the FH control packet to determine the part of the traffic which remains below the RBW threshold. If the buffer is found full (meaning that the received ATM cell is the last one of the cell train), then a new buffer must be dynamically allocated to host other ATM cells to come later. As each buffer is associated to a unique traffic type, it means that the XMIT_Q queue is implicitly instanced by traffic types. It can thus be seen as a set of different sub-queues MPDU_Qj, each of them being characterized by its own priority index j (even), as specified in Table 3.

The transmission side of the ATM Cell Handler is responsible for transmitting to the interface 62 the different ATM cells which have been previously received within MPDU from the interface 60. When an ATM cell has been passed to the interface 62, the corresponding memory can be returned to a pull of free memory.

MPDU Handler at the Mobile Terminal

The MPDU Handler is further split into two sub-entities: one dealing with reception of MPDU from the interface 60, the other dealing with transmission of MPDU to the interface 60.

The transmission side is responsible for sending to the interface 60 the MPDU specified in the slot map (passed from the Slave Scheduler 98) during the UP_RESERVED period, as well as MPDU issued during the UP_CONTENTION period. For this last case, the MPDU Handler is responsible for following the slotted Aloha scheme to be used during the UP_CONTENTION period. Once a MPDU transmission is complete, the associated buffer can be released and returned to a pool of free buffers. In addition, the transmission side of the MPDU Handler must send the bandwidth reservation requests which have been previously issued by the Slave Scheduler 98. Such requests can either take the form of piggybacked information carried by any MPDU flowing from the Mobile Terminal to the Access Point, or take the form of a dedicated control MPDU which is only issued for this purpose. In this later case, the request is sent during the UP_CONTENTION period. It should be noted that the Mobile Terminal can issue during the UP_CONTENTION period a MPDU carrying a bearer information ATM cell which itself carries a piggybacked bandwidth reservation request for remaining traffic to be sent.

The reception side of the MDPU Handler at the Mobile Terminal is responsible for receiving from the interface 60 the MPDU specified in the slot map built by the Master Scheduler 84 during the DOWN period. For each received MPDU, the reception side has several tasks to perform. First it must extract the ATM cells from the MPDU and enqueue them in the RCV_Q queue. Second it must identify the FH control packet received at the beginning of each time frame and pass it to the Slave Scheduler.

Slave Scheduler

The process run by the Slave Scheduler differs from the one of the Master Scheduler as the Slave Scheduler must strictly follow, for the downlink traffic, the slot map built by the Master Scheduler, and is responsible to schedule the part of the uplink traffic which fits within the time slots allocated for it by the Master Scheduler and also to place reservation requests for the part of the uplink traffic which is not covered by the reserved traffic scheduled by the Master Scheduler.

In other words, the Slave Scheduler updates the slot map found in the FH control packet so that the MPDU Handler determines exactly when traffic must be either received or transmitted. As the slot map is a descriptor of the sequence of time slots along the full time frame, it can be split into three different pieces: the slot_mapDOWN, the slot_mapUP_RESERVED and the slot_mapUP_CONTENTION. The Slave scheduler keeps the slot_mapDOWN unchanged, while it must specify which part of its uplink traffic will flow either during the reserved time slots of the UP_RESERVED period (by modifying the slot_mapUP_RESERVED), or during some time slots of the UP_CONTENTION period (by modifying the slot_mapUP_CONTENTION).

Figure 7:
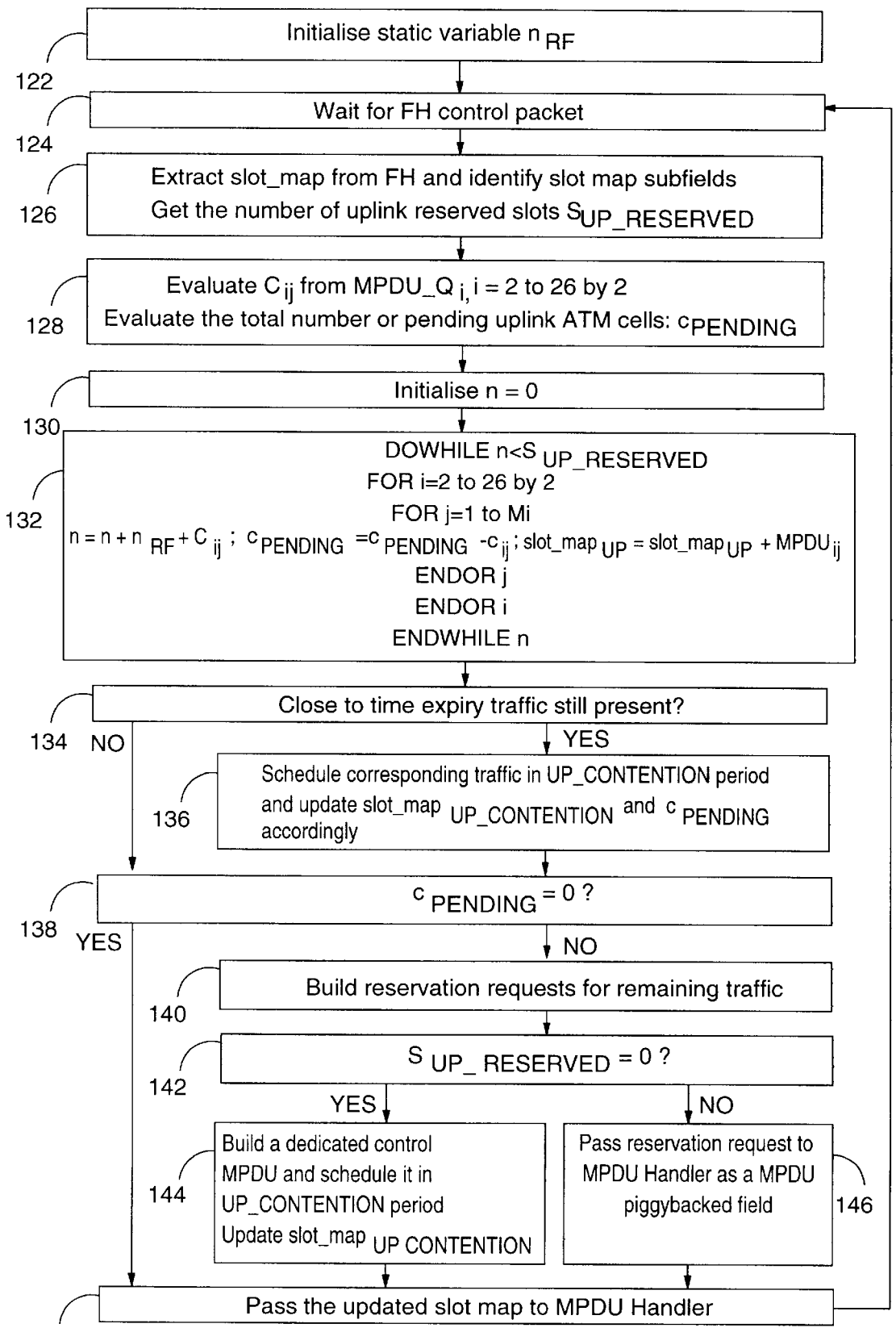
FIG. 7 is a flow chart of the logic followed by the Mobile Terminal Slave Scheduler according to the MAC protocol of the invention.

The Slave Scheduler processing is represented by FIG. 7. At the very beginning, the Slave Scheduler initializes the static variable nRF (block 122). Then it enters an endless loop which starts each time a new time frame begins (block 124) with the reception (from the MPDU Handler 96) of the FH control packet. The first action is to extract the slot map from FH, to split it into the three slot map sub-fields (DOWN, UP_RESERVED, UP_CONTENTION) and then to evaluate the number SUP_RESERVED of allocated time slots in the UP_RESERVED period (block 126). Then the Slave Scheduler evaluates its pending uplink traffic by compiling the content of the MPDU_Qj queues (j taking even values): it derives the variables $c_{i,j}$ (as previously defined for the Master Scheduler), and the aggregate number of pending uplink traffic ATM cells, noted cPENDING (block 128). Then the Slave Scheduler initializes a variable n to prepare the traffic allocation within the time slots reserved by the Master Scheduler for the UP_RESERVED period (block 130). The next action consists in filling all the reserved time slots with the pending uplink traffic, according to the various priorities identified by the indexes i of the XMIT_Qi queues (block 132). The MPDUs of highest priority are served first, and the Slave Scheduler updates accordingly the slot_mapUP_RESERVED and the number of remaining pending uplink traffic ATM cells cPENDING.

When this task has been done, the Slave Scheduler must work for the left uplink traffic, if any. The first point to look at is the presence of any remaining traffic that is close to its time expiry limit (block 134). It means that this traffic cannot wait for the next time frame before reaching its time expiration. If such traffic still remains unscheduled (branch YES of block 134) it has to be issued as soon as possible, that is during the UP_CONTENTION period of the current time frame. Thus the Slave Scheduler updates the slot_mapUP_CONTENTION and the variable cPENDING accordingly (block 136). At that point, the last action to perform is to place reservation requests if any pending traffic is still left unscheduled during the current time frame. This condition is determined by looking at the value of the cPENDING variable (block 138). If all the traffic has already been scheduled, (branch YES of block 138), then the process goes directly to the very last step (block 148) described later. Otherwise, the Slave Scheduler builds the various reservation requests needed for the remaining traffic (block 140). These requests specify the number of remaining ATM cells per ATM connections, so that the Master Scheduler can later prioritize them according to the corresponding traffic types. Then the Slave Scheduler must determine how to send the reservation requests to the Access Point (more accurately to the Master Scheduler). If some reserved uplink traffic is scheduled during the current time frame (SUP_RESERVED is not null, branch NO of block 142), then the reservation requests must be carried as information piggybacked in the MPDU to be sent during the UP_RESERVED period. For this purpose the Slave Scheduler passes the requests to the MPDU Handler (block 146) so that it can add it to the appropriate uplink MPDU(s). If none reserved traffic flows upward during the current time frame, the Mobile Terminal can only issue a dedicated control MPDU during the UP_CONTENTION period (block 144). For this purpose, the Slave Scheduler builds the control MPDU and allocates it for the UP_CONTENTION period; therefore the slot_mapUP_CONTENTION is also updated. The final step is to pass to the MPDU Handler the updated slot map (block 148), so that the MPDU Handler can determine for each period which traffic must be either received or sent.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. In a data communication system having at least one first network based on a wired ATM technology and at least one second network based on a wireless transmission technology, the system providing one or more connections between wired stations and wireless stations via an access point, access means for providing communication between the the wired and wireless stations, wherein said access means comprises:

means for defining a plurality of successive time frames during which data traffic from between an access point of the wired network and one or more wireless stations is communicated, each time frame having a plurality of time slots, the time slots for each time frame grouped into at least three periods: a first period for contention free transmission from the access point to the wireless stations; a second period for contention free transmission from the wireless stations to the access point; and, a third period for contention based transmission from the wireless stations to the access point;

means for varying the duration of each time frame as a function of the traffic load between the access point and the wireless stations while insuring that the time frame duration remains below an upper bound to comply with latency constraints imposed by the connections;

means for varying the duration of each of the three periods as a function of the traffic load and of the traffic constraints and insuring that the third period has a non-null minimum duration; and, means for scheduling the exchange of data information during each said successive time frames using network parameters for connections between the wired stations and wireless stations, and traffic characteristics and constraints.

2. The system of claim 1 wherein said means for varying the duration of said successive time frames and the duration of the three periods within each time frame are invoked at each time frame.

3. The system of claim 2, wherein means for varying the duration of the three periods determines the minimum duration of said third period based on the number of wireless stations of said second network without scheduled uplink traffic during said second period.

4. The system of claim 3, wherein the minimum duration of said third period is determined using a growing linear and/or exponential function of the number of wireless stations of said second network without scheduled traffic during said second period.

5. The system of claim 4, wherein said second network is a wireless network comprising a plurality of Mobile Terminals, each Mobile Terminal including a transceiver, and wherein said access means comprise an Access Point having a transceiver for radio communication with the transceivers of each of the plurality of Mobile Terminals having ATM connections for carrying data traffic between the mobile terminals and wired stations.

6. The system of claim 5, wherein said means limiting the duration of said successive time frames utilize parameters (PCR, CDVT, CTD, BT) corresponding to each ATM connection making the ATM traffic.

7. The system of claim 6, wherein each time slot lasts at least the time required for the transmission of an ATM cell.

8. The system of claim 7, wherein several ATM cells can be transmitted either by the Access Point or by said plurality of Mobile Terminals, during a sequence of contiguous time slots, forming a cell train.

9. The system of claim 8, wherein said Access Point or said plurality of Mobile Terminals further comprises means for storing the ATM cells to be transmitted in memory buffers having the structure of a said cell train.

10. The system of claim 9, further including means for ensuring that the part of said ATM traffic which has been guaranteed by an ATM connection contract established at an ATM connection set-up, is carried over a wireless channel between said Access Point and said plurality of Mobile Terminals using a reservation based, contention free access method.

11. The system of claim 10, wherein said means include both static and dynamic reservation means.

12. The system of claim 11, comprising means to define a set of priorities for said ATM traffic, which governs which type of static or dynamic reservation means apply for this traffic.

13. The system of claim 12, wherein said means for defining the set of ATM traffic priorities depends on the service class and quality of service parameters corresponding to each of ATM connections making said ATM traffic.

14. The system of claim 13, wherein said means for defining the set of ATM traffic priorities defines two traffic thresholds derived from the PCR, SCR and MCR parameters of the various ATM connections making said ATM traffic.

15. The system of claim 14, wherein said plurality of Mobile Terminals further comprising means for scheduling said ATM traffic during said time frame, conjointly within said Access Point.

16. The system of claim 15 wherein the scheduling means of said plurality of Mobile Terminals further comprising means to issue, during said time frame, reservation requests for transmission to said Access Point of the portion of the traffic not scheduled by said Access Point during the current said time frame.

17. The system of claim 16, wherein the reservation requests can either be carried as piggybacked information within scheduled traffic sent to the said Access Point, or be carried as a dedicated unscheduled control packet sent to said Access Point.

18. The system of claim 17, wherein the scheduling means of said plurality of Mobile Terminals comprise means to schedule transmission of ready to be sent ATM cells within the sub-set of said second period which has been allocated to it by the scheduling means of said Access Point.

19. The system of claim 18, wherein the scheduling means of said plurality of Mobile Terminals comprise means to schedule transmission of ready to be sent ATM cells during said third period, if said ready to be sent ATM cells cannot wait the next time frame before being transmitted to said Access Point.

20. The system of claim 19, wherein the scheduling means of said Access Point broadcast to said plurality of Mobile Terminals at the beginning of each time frame, a frame header control packet specifying the structure and the content of said time frame.

21. The system of claim 20 further comprising a descriptor specifying the traffic to be scheduled for each time slot.

22. In a data communication system having at least one first network based on wired transmission technology and at least one second network based on a wireless transmission technology, the system providing one or more connections between wired stations and wireless stations via an access point, a method of providing communication between the wired and wireless stations, comprising the steps of:

defining a plurality of successive time frames during which data traffic between an access point of the wired network and one or more wireless stations is communicated, each time frame having a plurality of time slots, the time slots for each time frame grouped into at least three periods:
  a first period for contention free transmission from the access point to the wireless stations;
  a second period for contention free transmission from the wireless stations to the access point; and,
  a third period for contention based transmission from the wireless stations to the access point;
varying the duration of each time frame as a function of the traffic load between the access point and the wireless stations while insuring that the time frame duration remains below an upper bound to comply with latency constraints imposed by the connections;
varying the duration of each of the three periods as a function of the traffic load and of the traffic constraints and insuring that the third period has a non-null minimum duration; and,
scheduling the exchange of data information during each said successive time frames using network parameters for connections between the access point and wireless stations, and traffic characteristics and constraints.

23. The method of claim 22 wherein the duration of each time frames and the duration of the three periods within each time frame is determined at each time frame.

24. The method of of claim 23, further comprising the step of:
insuring that the third period has a non-null minimum duration.

25. The method of claim 24 further comprising the step of:
determining the minimum duration of said third period based on the number of stations of said second network without scheduled uplink traffic during said second period.

26. The method of claim 25 further comprising the step of:
determining the minimum duration of said third period as a growing linear and/or exponential function of the number of stations of said second network without scheduled traffic during said second period.

27. The method of claim 22, wherein the data traffic between the wired stations and the wireless stations comprises one or more ATM connections.

28. The method of claim 27 wherein the step of varying the duration of said successive time frames makes use of connection parameters (PCR, CDVT, CTD, BT) corresponding to each ATM connection comprising the traffic.

29. The method of claim 27 wherein the duration of each time slot is at least the time required for the transmission of an ATM cell.

30. The method of claim 27, further comprising the step of:
forming a cell train by transmitting a plurality of ATM cells during a sequence of contiguous time slots.

31. The method of claim 30 further comprising the step of:
storing ATM cells to be transmitted in memory as cell trains.

32. The method of claim 27, further comprising the step of:
insuring that the part of said traffic which has been guaranteed by an ATM connection contract, established at ATM connection set-up, is carried from the Access Point to the plurality of wireless stations during the first period.

33. The method of claim 32 further comprising
insuring the ATM connections are serviced using both statically reserved and dynamicly reserved time slots.

34. The method of claim 33 further comprising the step of:
defining a set of priorities for the ATM traffic, which governs whether static or dynamic reservation applies to the traffic.

35. The method of claim 34 wherein the step of defining the set of ATM traffic priorities uses service class and quality of service parameters corresponding to each of ATM connections comprising the ATM traffic.

36. The method of claim 35, wherein the step of defining the set of ATM traffic priorities defines two traffic thresholds derived from the PCR, SCR and MCR parameters of the various ATM connections comprising the ATM traffic.

37. The method of claim 36 further comprising the step of:
issuing reservation requests for transmission to said Access Point of the portion of the traffic not scheduled by said Access Point during the current said time frame.

38. The method of claim 37, wherein the reservation requests can either be carried as piggybacked information within scheduled traffic sent to the said Access Point, or be carried as a dedicated unscheduled control packet sent to said Access Point.

39. The method of claim 37, further comprising the step of:

scheduling transmission of ready to be sent ATM cells within the sub-set of said second period which has been allocated to it by the Access Point.

40. The method of claim 37 further comprising:

scheduling transmission of ready to be sent ATM cells during said third period, if said ready to be sent ATM cells cannot wait until the next time frame before being transmitted to said Access Point.

41. The method of claim 22 including the step of:

broadcasting to said plurality of terminal stations at the beginning of each time frame, a frame header control packet specifying the structure and the content of said time frame.

42. The method of claim 41, with the frame header having a descriptor specifying the traffic to be scheduled for each time slot.

* * * * *

UNITED STATES PATENT AND TRADEMARK OFFICE
CERTIFICATE OF CORRECTION

PATENT NO.   : 5,970,062
DATED        : Oct. 19, 1999
INVENTOR(S)  : Bauchot

It is certified that error appears in the above-identified patent and that said Letters Patent is hereby corrected as shown below:

[73] "Assignee" Should read:

International Business Machines Corporation

Signed and Sealed this

Second Day of May, 2000

Attest:

Q. TODD DICKINSON

*Attesting Officer*    *Director of Patents and Trademarks*